(12) United States Patent
Jerman et al.

(10) Patent No.: US 6,625,101 B1
(45) Date of Patent: Sep. 23, 2003

(54) APPARATUS FOR FINELY ADJUSTING OPTICAL COMPONENTS

(75) Inventors: John H. Jerman, Palo Alto, CA (US); John D. Grade, Mountain View, CA (US); Albert L. Tervalon, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/343,611

(22) Filed: Jun. 30, 1999

Related U.S. Application Data
(60) Provisional application No. 60/120,427, filed on Feb. 16, 1999.

(51) Int. Cl.⁷ .................................................. G11B 7/00
(52) U.S. Cl. .............................. 369/112.01; 369/44.15; 369/44.16
(58) Field of Search ....................... 369/112.01, 44.11, 369/44.14, 44.15, 44.16

(56) References Cited

U.S. PATENT DOCUMENTS

| | | | | |
|---|---|---|---|---|
| 4,794,580 A | * | 12/1988 | Ikedo et al. | ............. 369/44.16 |
| 5,377,289 A | | 12/1994 | Johnson et al. | ............... 385/65 |
| 5,841,593 A | * | 11/1998 | Ikegame et al. | ......... 369/44.15 |

OTHER PUBLICATIONS

Guyenot, V.; Eberhardt, R.; Tittelbach, G.; Risse, S., "Mounting, Cementing and Handling of Microoptical Elements," SPIE vol. 2783 (3/96), pp. 105–116.

J.P. Schmidt, A. Cordes, J. Muller, H. Burkhardt, "Laser–fiber–coupling by means of a silicon micro–optical bench and a self–aligned soldering process," SPIE vol. 2449 (5/95), pp. 176–183.

J. Sochtig, H. Schrift, B.D. Patterson, S. Westenhofer, "Replicated diffractive optical lens components for laser–diode to fiber coupling in optical bench arrangements," SPIE vol. 3226 ('97), pp. 44–55.

Henein, S.; Bottinelli, S.; Clavel,R., "Parallel spring stages with flexures of micrometric cross–sections," SPIE vol. 3203 ('98), pp. 209–220.

S.T. Smith and D.G. Chetwynd, *Foundations of Ultraprecision Mechanism Design*, Gordon and Breach Science Publishers, 1992, 22 pages.

M.C. Wu, et al., "Micromachined free–space integrated micro–optics," Reprinted from *Sensors and Acutators A: Physical*, vol. 50(1–2), pp. 127–134 (Aug. 1995), 8 pages.

Comtois, J., and Bright, V., "Design techniques for surface–micromachining MEMS processes," SPIE vol. 2639, ('95), pp. 211–222.

Klaassen, et al., "Silicon Fusion Bonding And Deep Reactive Ion Etching: A New Technology For Microstructures," Transducers '95—Eurosensors IX, Stockholm, Sweden (1995), pp. 556–559.

RM Bostock, et al., "Silicon nitride microclips for the kinematic location of optic fibres in silicon V–shaped grooves," J. Micromech. Microeng. 8(1998) pp. 343–360. Printed in the U.K.

J. Robert Reid, et al., "Automated Assembly of Flip–Up Micromirrors," Transducers '97, 1997 Int'l Conference on Solid–State Sensors and Actuators, Chicago, Jun. 16–19, 1997.

* cited by examiner

*Primary Examiner*—Muhammad Edun
(74) *Attorney, Agent, or Firm*—Dorsey & Whitney LLP

(57) ABSTRACT

An apparatus for finely adjusting an optical component is described. The apparatus may include an optic component, a substrate, and an adjuster. The adjuster may include a platform coupled to the optic component, and a linkage of notched springs coupled to both the platform and the substrate. The linkage of notched springs provides for motion of the platform relative to the substrate along primarily one axis. The apparatus may be used in a data storage system to adjust the position of the optic component in order to focus light propagated through the optic component.

30 Claims, 7 Drawing Sheets

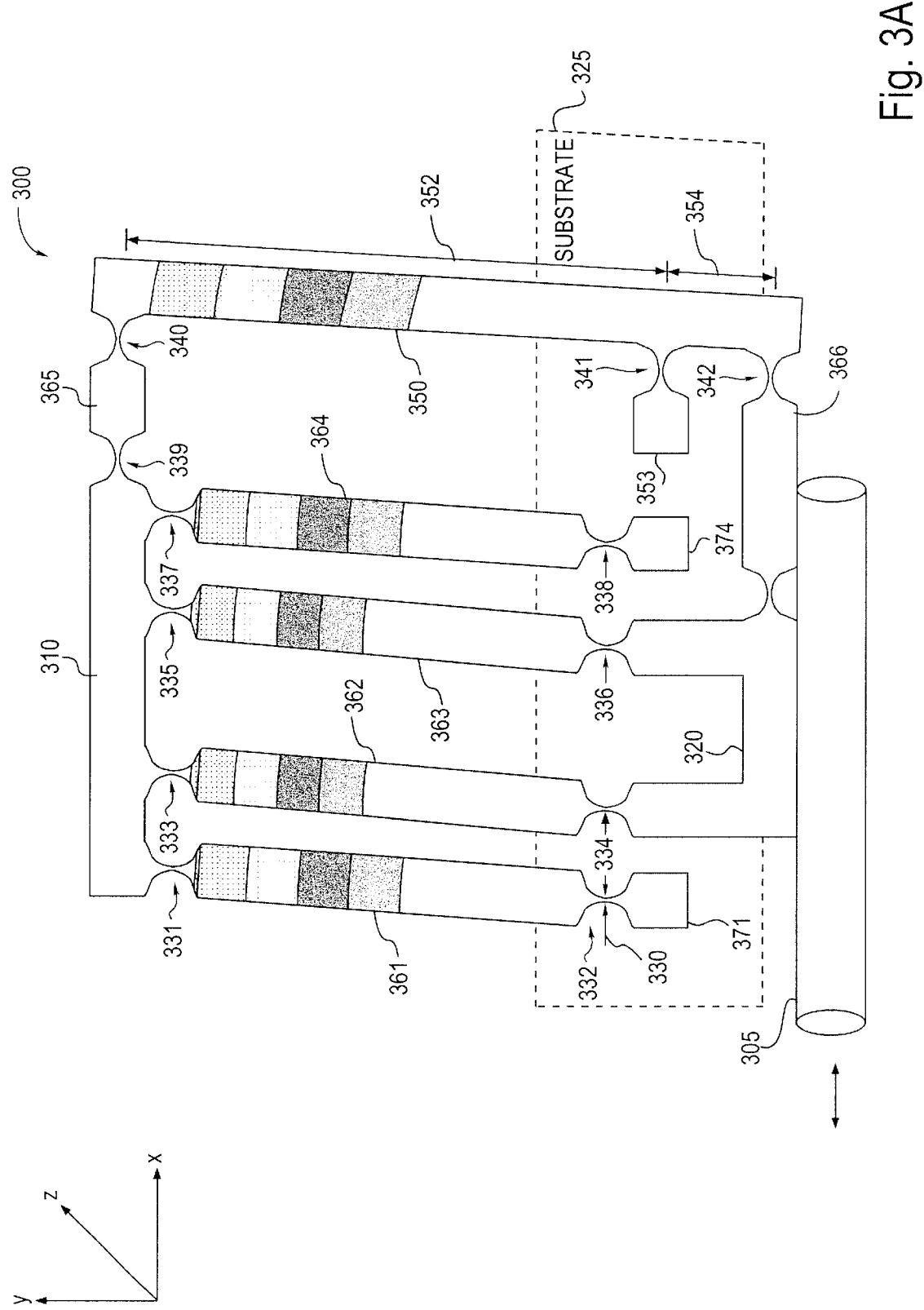

APPARATUS FOR FINELY ADJUSTING OPTICAL COMPONENTS

REFERENCE TO RELATED APPLICATION

This application claims the benefit of U.S. Provisional Application No. 60/120,427 filed Feb. 16, 1999.

FIELD OF THE INVENTION

This invention relates to the field of micro-sized mechanisms and, more specifically, to the use of micro-sized mechanisms to adjust optical components.

BACKGROUND

Precision assembly of micro-sized components is required in a variety of applications, for example, data storage systems. One type of data storage system, known as a magneto-optical (MO) storage system, provides storage of data on rotating disks. The disks are coated with a magneto-optical material and divided into magnetic areas referred to as domains. The data is stored as magnetization orientations in these magnetic domains. The magnetization is recorded in the MO material by focusing a laser beam of light to form an optical spot in a disk domain. The diameter of the focused spot may be smaller than approximately 1 micron ($\mu$m). Information is read from a particular domain by using a less powerful laser beam, making use of the Kerr effect, to detect a rotation of polarization of light reflected off the disk's surface.

Optical fibers connected to a head assembly are used to propagate light from the laser source to the disk. The head assembly contains optical components to direct the light from the optical fiber toward the rotating disk, and also to direct the light reflected from the rotating disk to the optical fiber. In one type of MO storage system, the head assembly is located on an actuator arm that moves the head assembly along a radial direction of the disk. As the disk rotates, the head assembly can be positioned over a particular domain. Precise alignment of the optical components in the head assembly is required to focus light to form the required optical spot on the disk.

Traditional optical storage systems use optical head assemblies containing large optical components. The resulting head assemblies are relatively massive, thereby increasing the time required to move the head to disparate regions over the disk's surface. One method of manufacturing head assemblies produces optical components with sizes on the order of 250 $\mu$m, thereby reducing the mass of optical head assemblies. One problem with using such head assemblies, however, is that greater precision is required to hold, align, and adjust the optical components in order to focus laser light onto an optical spot within a disk domain.

One prior art method of aligning optical components uses simple v-groove structures etched into silicon. In particular, the method uses these v-groove structures to align laser diodes and collimating lenses to optical fibers. These v-groove structures, however, do not allow for particular motion of the fiber with respect to the silicon v-groove and do not account for variations in fiber diameter or fiber core centricity. As such, precision adjustment of optical components with respect to each other after initial alignment is not possible.

Another prior art alignment method uses a series of trenches in a silicon block to align a laser diode chip, lens, and optical fiber. In particular, the components are used in a telecommunications application that operates at a wavelength of approximately 1.3 $\mu$m. The method relies on the tendency of the components to self-align themselves due to the surface tension of molten solder connecting them.

One problem with such a method is that it may not be able to produce the necessary alignment tolerances to achieve a high coupling efficiency between optical components in applications that use a smaller light wavelength, for example, data storage systems (operating with a 410 nanometer light wavelength or less). The required alignment tolerances for a given coupling efficiency between optical components corresponds roughly to the wavelength of light propagated through the optical components. In addition, the required coupling efficiency, itself, is typically more stringent in data storage systems. As such, a self-alignment method may not be suitable for data storage or other critical visible light applications that use smaller wavelengths of light.

SUMMARY OF THE INVENTION

The present invention pertains to an apparatus for finely adjusting optical components. The assembly may include a first optic component, a substrate, and an adjuster. In one embodiment, the adjuster may include a first platform coupled to the first optic component, and a linkage of notched springs coupled to the first platform and the substrate. The linkage of notched springs provides for motion of the first platform along primarily one axis.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIG. 3A illustrates one embodiment of an optical component adjuster.

DETAILED DESCRIPTION

In the following description, numerous specific details are set forth such as examples of specific materials, processes, dimensions, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

An apparatus for finely adjusting optical components is described. In one embodiment, the apparatus is used in a disk drive head assembly for adjusting optical components, for examples, an optical fiber and a lens. The optical components within the head assembly are used to direct laser light from an optical fiber toward a rotating disk. In one embodiment, the head assembly is located on an actuator arm that moves the head assembly along a radial direction of the disk. As the disk rotates, the head assembly may be positioned over a particular domain.

In one embodiment, the apparatus may include a platform coupled to the optical component and a linkage of springs. The linkage of springs may be coupled to the platform and the head assembly. The linkage of springs may provide for movement of the platform along primarily one axis to focus laser light propagated through the optical component onto an optical spot within a disk domain.

It should be noted that the apparatus is described herein in relation to a disk drive system only for illustrative purposes and is not meant to be limited to adjustment of optical components in disk drive systems. In alternative embodiments, the apparatus described herein may be implemented with a wide variety of other systems requiring precision adjustment of micro-sized components, for examples, telecommunication, fiber optics, and optical sensing.

Figure 1:
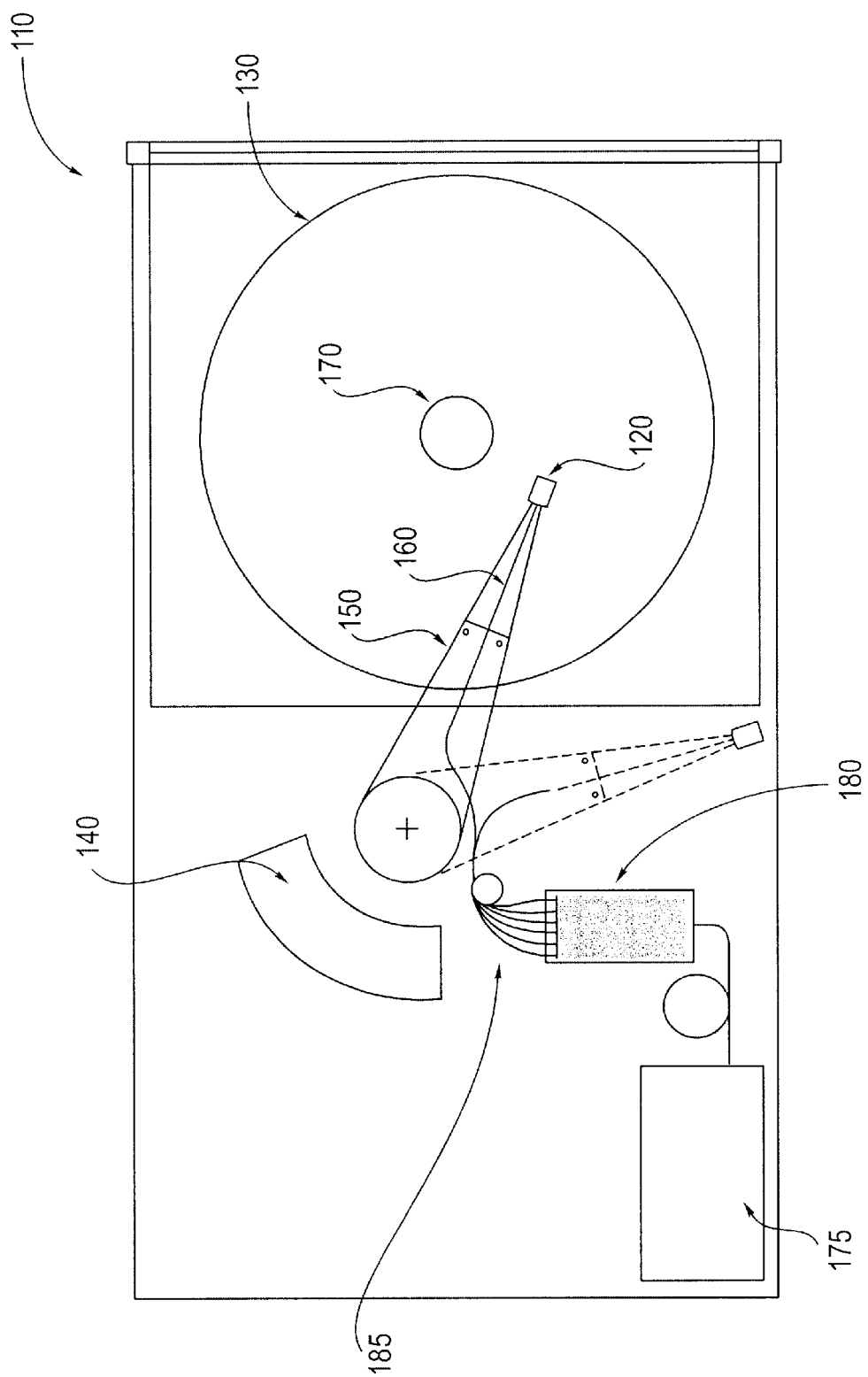
FIG. 1 illustrates one embodiment of a storage system having an optical component adjuster.

FIG. 1 illustrates one embodiment of a storage system having an optical component adjuster. In one embodiment, the storage system 110 includes low-profile flying magneto-optical head assembly 120 that uses a Winchester-type rotary actuator arm 150 with air bearing technology. The storage system 110 also includes a disk 130, a rotary actuator magnet and coil assembly 140, an optical fiber 160, a spindle motor 170, a laser and optics assembly 175, and an optical switch 180. It will be apparent to one skilled in the art that the MO storage system may include as few as one head assembly 120 and one disk 130 or, in alternative embodiments, may include multiple disks with each side of a disk having a corresponding head assembly.

The storage system 110 uses a laser source on laser and optics assembly 175 to generate a laser beam of light. The light is propagated to a particular head assembly, for example, head assembly 120, using optical switch 180 and optical fiber 160. The laser source typically used in a MO storage system is a radio frequency modulated Fabry-Perot laser. The laser beam is used to write and read data from disk 130 as previously discussed. Where multiple head assemblies are used, optical switch 180 is used to selectively couple the laser and optics assembly 175 to one of the head assemblies, for example, head assembly 120. Optical fiber 160 propagates incident light to head assembly 120, which is then directed toward the rotating disk 130. The light propagated through head assembly 120 is directed to a spot on disk 130. Head assembly 120 includes one or more optical component adjusters that operate to focus the light propagated through the fiber onto the spot on disk 130.

Head assembly 120 is positioned over a particular domain on disk 130 using spindle motor 170 to rotate disk 130, and rotary actuator magnet and coil assembly 140 to move actuator arm 150 radially across disk 130. In alternative embodiments, other techniques for directing light and head positioning may be used, for example, the rotary assembly may be replaced with a linear slider assembly to move head assembly 120 across disk 130.

During data read operation, head assembly 120 also directs a reflected light from the rotating disk 130 to optical fiber 160 to be propagated to laser and optics assembly 175. In one embodiment, discrete optical components on laser and optics assembly 175 optically process the polarization components of the reflected laser beam. A polarization maintaining fiber may be used for optical fiber 160 to preserve the polarization states of the reflected light beam through the optical path of storage system 110.

Figure 2A:
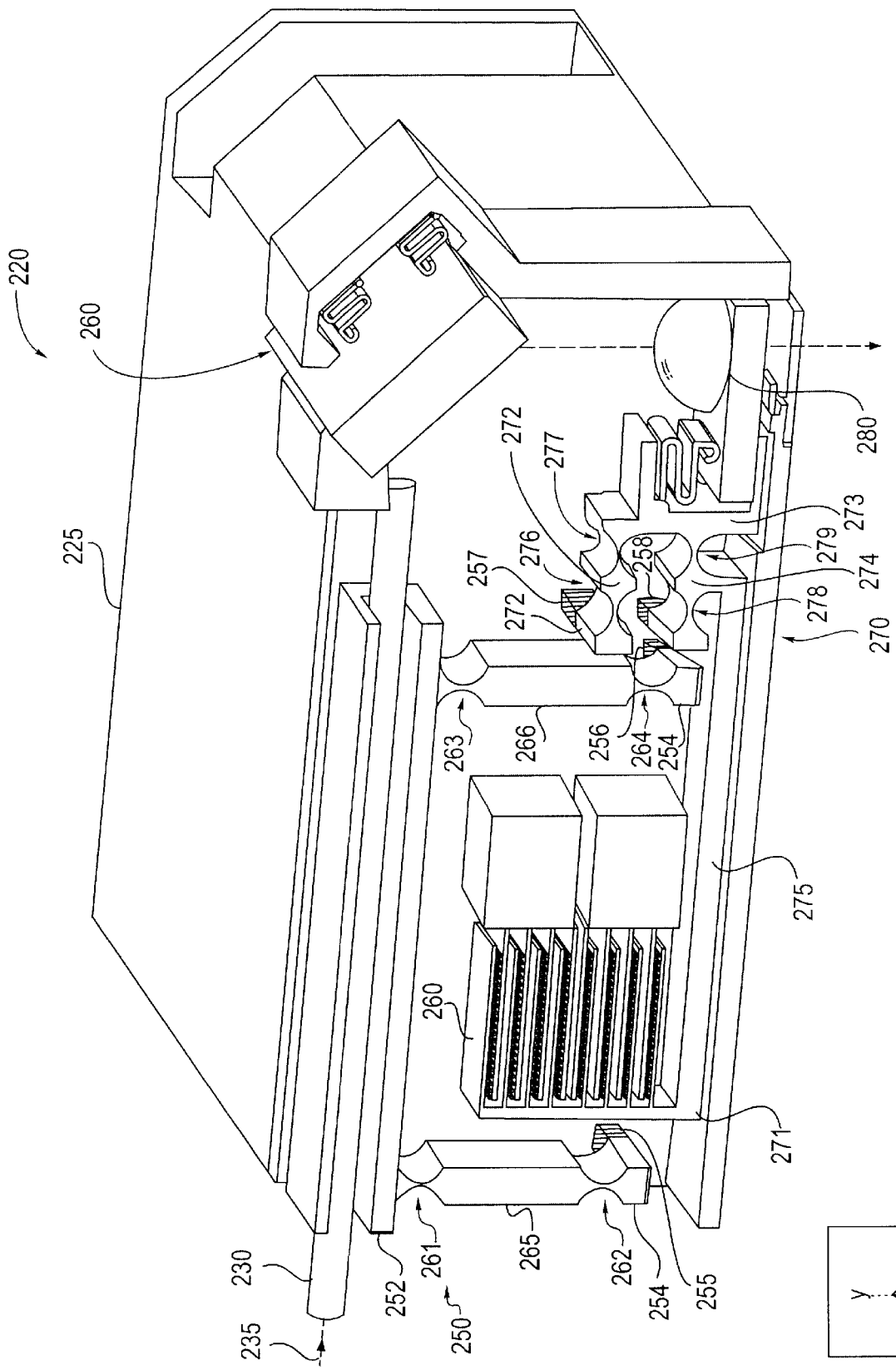
FIGS. 2A and 2B show three dimensional and two dimensional illustrations, respectively, one embodiment of a head assembly having optical component adjusters.
Figure 2B:
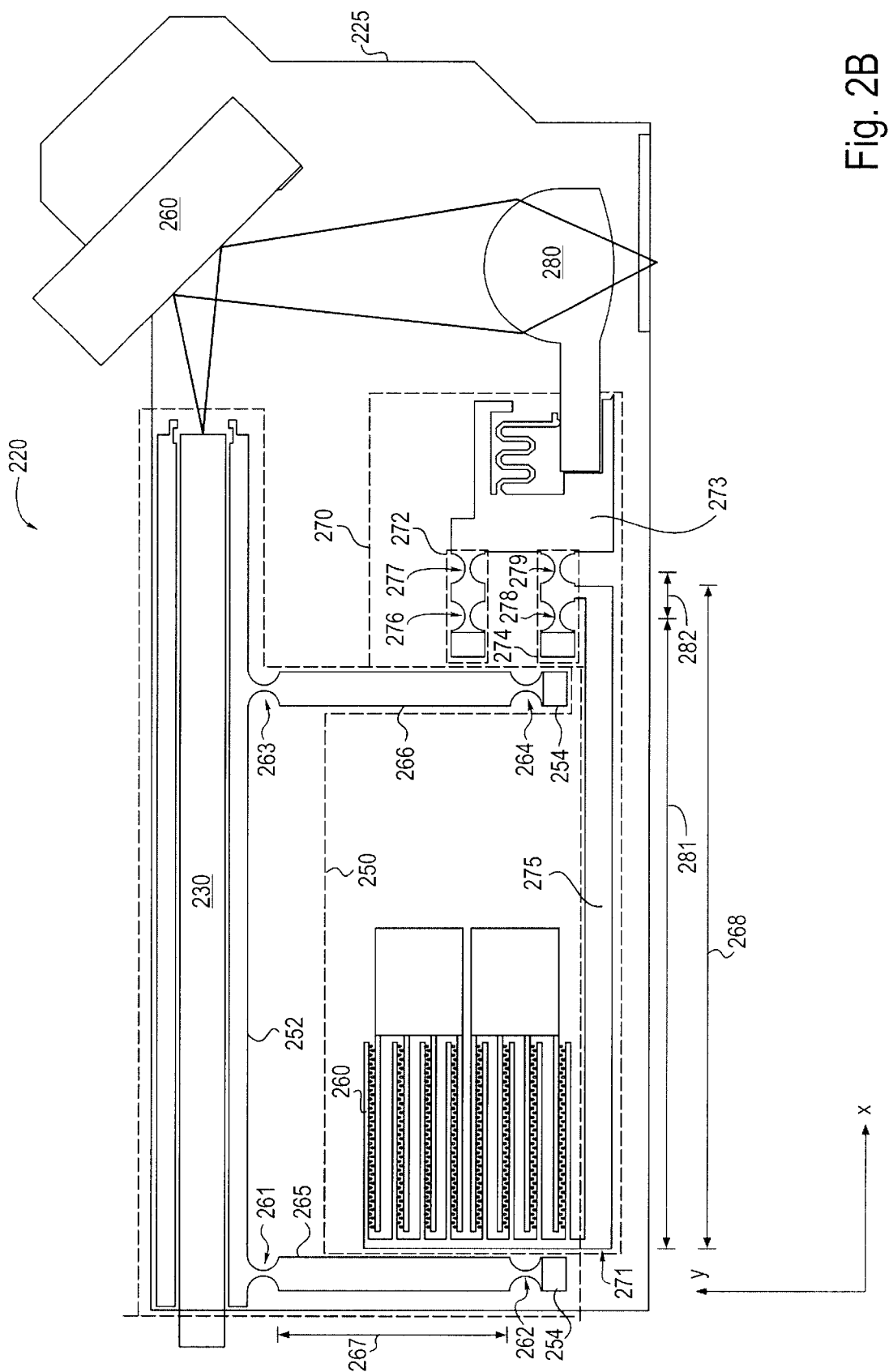

FIGS. 2A and 2B show three dimensional and two dimensional illustrations, respectively, of one embodiment of a head assembly having optical component adjusters. Head assembly 220 includes a fiber adjuster 250 and a lens adjuster 270, a body 225, an optical fiber 230, a mirror 260, and a lens 280. In one embodiment, optical fiber 230 and lens 280 are coupled to fiber adjuster 250 and lens adjuster 270, respectively, with an adhesive. Light generated by a laser source is propagated along the optic axis of optical fiber 230 (x-axis) to mirror 260. The light is reflected by mirror 260 to lens 280. Lens 280 operates to focus the light onto a disk (not shown) located underneath head assembly 220. Dashed line 235 indicates the propagation path of the light.

By adjusting the position of optical fiber 230 along the x-axis or lens 280 along the y-axis, the light beam may be focused onto an optical spot on the disk. In another embodiment, head assembly 220 does not include fiber adjuster 250. In yet another embodiment, head assembly 220 does not include lens adjuster 270.

Fiber adjuster 250 linearly couples optical fiber 230 to head assembly 220. In one embodiment, fiber adjuster 250 uses a dual platform linkage that constrains the motion of fiber 230 to be approximately parallel to the optic axis of optical fiber 230 (i.e., x-axis). Fiber adjuster 250 includes platforms 252 and 254 and a linkage of notched springs including springs 261, 262, 263, and 264 and linkage bars 265 and 266. In one embodiment, the distance between linkage bars 265 and 266 is approximately 975 $\mu$m. In another embodiment, the distance between linkage bars 265 and 266 may be more or less than 975 $\mu$m.

Platform 252 is coupled to optical fiber 230. The linkage of notched springs couples platform 252 to platform 254. Platform 254 is coupled to body 225 at positions 255 and 256 such that a gap exits between fiber adjuster 250 and body 225 along the rest of fiber adjuster 250. In this manner, optical fiber 230 may be move relative to body 225.

The linkage of notched springs provides a substantially rectilinear motion of platform 252 using springs 261–264. Each spring 261–264 operates as an elastic rotary bearing where the spring distorts about an axis nominally coincident with the thinnest part of the spring notch. The un-notched thicker sections of the spring remain essentially undistorted. The distortion of springs 261 and 263 relative to springs 262 and 264, respectively, provide for the rectilinear motion of platform 252 along the x-axis. In one embodiment, the motion of platform 252 along the x-axis is approximately 10 microns. Although some motion occurs along the z-axis, this minor lateral shift is acceptable in the configuration of the storage system.

The parasitic motion in the y-axis of platform 252 depends on the magnitude of the x-axis motion of platform 252 and the effective length of linkage bars 265 and 266. The parasitic motion is a manifestation of what is referred to as the cosine error. Platform 252 moves along the y-axis by an amount approximately equal to the length 267 of linkage bars 265 and 266, multiplied by a factor equal to $(1-\cos\theta)$, where $\theta$ is the angular deflection of each of linkage bars 265, 266. The angular deflection, for the small angles of interest in these mechanisms, may be approximated by the x-axis deflection of platform 252 divided by the length 267 of linkage bars 265 and 266.

As an example, for a linkage bar of length 0.5 millimeters (mm) and an x-axis deflection of 20 $\mu$m, the y-axis motion of the platform is less than 0.5 μm, at maximum deflection. For a given linkage bar length, the parasitic motion varies as the square of the x-axis deflection. Thus, for small x-axis motions, the parasitic y-axis motion may be considerably reduced. In particular, for head assembly 220 of FIGS. 2A and 2B, the parasitic motion does not appreciably affect the performance of the storage system.

The focus position of fiber 230 along the x-axis may be adjusted by an external actuator (not show), for example, a motor coupled to fiber adjuster 250. In another embodiment, an internal actuator may be used to adjust fiber 230. In yet another embodiment, the focus position of fiber 230 may be manually adjusted. Springs 261, 262, 263, and 264 may be stiff to off-axis motions, so that manual positioning, which may not be precisely parallel to the desired direction of motion, is effectively channeled into motion along the desired axis of motion (x-axis).

Lens adjuster 270 uses a coupled lever arrangement where the focus height adjustment of lens 280 along the y-axis is controlled by the rotation of adjustment arm 275 about the z-axis. Levers 272 and 274 provide for parallel motion of lens 280 with minimal angular shift with z-axis position of lens 280.

In one embodiment, lever 274, having springs 278 and 279, is coupled to body 225 at end 258 such that a gap exits between lens adjuster 270 and body 225 along the rest of lens adjuster 270. The other end of lever 274 is coupled to platform 273. In this manner lens 280 may be moved relative to body 225. Adjustment arm 275 is coupled to lever 274 at a position disposed between the ends of lever 274. When the distal end 271 of adjustment arm 275 moves in a positive y-axis direction, platform 273 moves in an opposite negative y-axis direction.

Adjustment arm 275 operates to produce a relatively large reduction ratio in the movement of lens 280 along the y-axis in relation to the rotation of adjustment arm 275 about the z-axis. The reduction ratio is set by the distance 282 between springs 278 and 279, and the angle of rotation of adjustment arm 275. The angle of adjustment arm 275 is approximately given by the ratio of the y-axis displacement of the distal end 271 of adjustment arm 275 from spring 278 and distance 281 between the distal end 271 and spring 278.

Lever 272 is coupled to body 225 at one end 257 and coupled to platform 273 at the other end. The addition of lever 272, having springs 276 and 277, operates to constrain the motion of platform 273 to be substantially along the optic axis of lens 280 (i.e., y-axis), except for a cosine error similar to that described above.

As an example, if length 268 of adjustment arm 275 is approximately 1.125 mm and distance 282 between springs 278 and 279 is approximately 125 μm, the theoretical reduction ratio is 11:1 between the deflection of distal end 271 of adjustment arm 275 and platform 273. The actual reduction ratio may also be influenced by the non-ideal behavior of the springs. As such, the actual reduction ratio may be less than the theoretical reduction ratio.

Motor 260 is used to set the focus height of lens 280 for calibration of the drive during manufacturing. Motor 260 may also be used during operation of the drive to adjust for focus changes due to, for examples, temperature, flying location, and vibration of the drive. In one embodiment, motor 260 is an electrostatic motor. In other embodiments, motor 260 may be driven by other sources, for example, piezoelectric. In another embodiment, adjustment arm 275 may be manually moved to position the focus height of lens 280. A locking mechanism, for example, a ratchet may be used to secure the position of lens 280 as it is adjusted. The operation of a motor and a ratchet are well known in the art, accordingly, a more detailed description of their operation is not provided herein.

The range of motion of adjustment arm 275 is small enough that adjustment arm 275 moves substantially in only a vertical direction along the y-axis, and the parasitic lateral motion of lens 280 with the adjustment of the focus height is minimal. In one embodiment, for example, the range of adjustment of the focus height is approximately +/−0.5 microns.

The reduction ratio of lens adjuster 270 may be considered in combination with the range of motion of motor 260. In one embodiment, motor 260 is an electrostatic motor that consists of two sets of comb drive actuators. One set drives distal end 271 of adjustment arm 275 in a positive y-axis direction, and the other set drives distal end 271 of adjustment arm 275 in a negative y-axis direction.

In one embodiment, it may be convenient, with current processing technologies, to provide a gap between electrostatic elements on the order of 5 μm. Such a gap provides an approximate minimum total range of motor 260 to also be on the order of 5 μm. For an embodiment where the range of adjustment of lens 280 is approximately 0.5 μm, the minimum total range of motor 260 is a factor of 10 times larger than the range of motor 260 with a 5 μm gap.

FIG. 3A illustrates one embodiment of an optical component adjuster. Adjuster 300 operates as a compound linear rectilinear spring that provides for relative motion between platforms 310 and 320. Platform 320 may be coupled to an optical component, for example, fiber 305. Platforms 310 and 320 are coupled by a linkage of notched springs.

In one embodiment, the linkage of notched springs includes springs 331–343 and linkage bars 361–366. Pivot lever 350 is coupled between platforms 310 and 320. Springs 331–343 are notched flexure hinges that may be considered to operate as single degree of freedom pin joints. The resulting linkage of notched springs that couple platforms 310 and 320 have one degree of freedom such that platform 320 is constrained to move primarily along the x-axis.

Pivot lever 350 is coupled to a substrate 325, for example, body 225 of FIGS. 2A and 2B, via spring 341 that is fixed to the substrate 325 at a point 353. The distance between platform 310 and fixed point 353 is length 352 and the distance between platform 320 and fixed point 353 is length 354. The linkage of notched springs provides kinematic, rather than merely elastic, coupling between platforms 310 and 320 having one degree of freedom. As such, any motion of platform 310 will impart a fixed motion on platform 320. The ratio of the magnitude of motion between platforms 310 and 320 is set by the relative fixture location of pivot lever 350. In particular, the ratio of the motion of platform 320 to platform 310, relative to substrate 325, may be approximated by the ratio of length 352 to length 354 of pivot lever 350. In one embodiment, a 5:1 ratio between length 352 and length 354 is used. In another embodiment, other ratios may be used.

Linkage bars 361 and 364 are fixed to the substrate 325 via springs 332 and 338, respectively, at points 371 and 374, respectively. Linkage bars 361 and 364 operate to reduce parasitic motion (i.e., along the y-axis) of platform 320. As such, a rectilinear motion along the x-axis results due to the approximately identical flexure of spring 334 with springs 338, 332, and 334, as well as, the approximately identical flexure of spring 333 with springs 337, 331, and 335. In one embodiment, the width 330 of springs 331–343 is approximately 5 microns and the depth (into the page) is approximately 85 microns. In another embodiment, springs 331–343 may have other widths, depths, and degrees of freedom.

Multiple linkages of notched springs may also be connected in series to achieve total ratios equal to the product of the individual ratios. In another embodiment, adjuster 300 may be used in a reverse manner whereby a relatively small motion (e.g., caused by a piezoelectric element) on platform 310 may cause a relatively large motion on the platform 320.

Figure 3B:
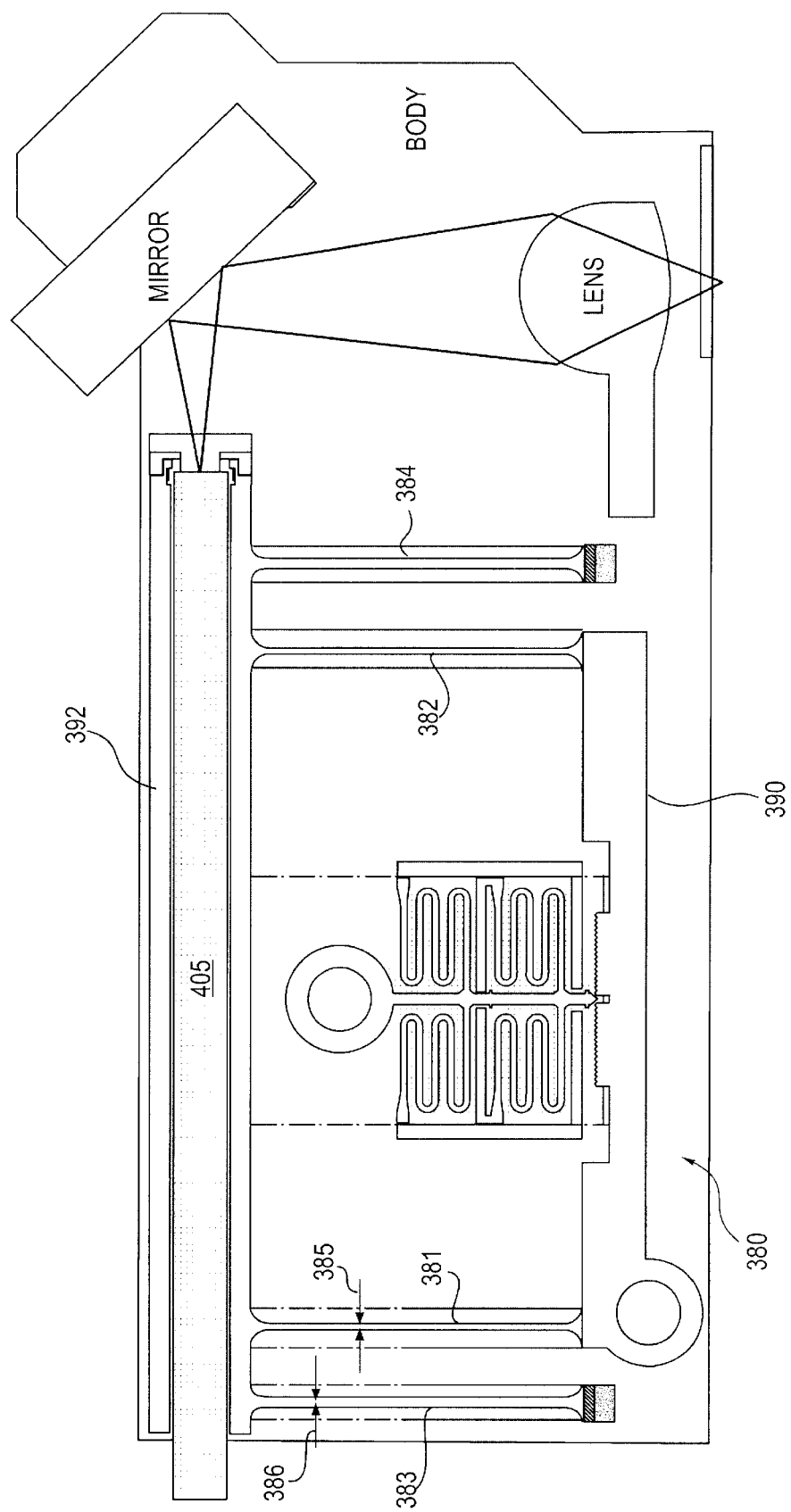
FIG. 3B illustrates another embodiment of springs used in an optical component adjuster.

The linkages used in the adjusters are not limited to notched springs as illustrated in FIG. 3A. In another embodiment, springs having two degrees of freedom may be used, for examples: a two axis notch type joint and a universal joint with coincident axes. In other embodiments, other types of springs may also be used as shown in FIG. 3B.

FIG. 3B illustrates another embodiment of springs used in an optical component adjuster. Adjuster 380 includes linear springs 381–384 coupled between platforms 390 and 392. The displacement of platform 392 relative to platform 390 is given by $\lambda_2/(\lambda_2+\lambda_1)$, where $\lambda_2$ and $\lambda_1$ are the stiffness of springs 381, 382 and 383, 384, respectively. For linear springs, the stiffness may be approximated as the cube of the thickness of the springs. In one embodiment, thickness 386 of linear springs 383 and 384 is 20 $\mu$m, and thickness 385 of linear springs 381 and 382 is 10 $\mu$m. As such, the resulting displacement of platform 392 is approximately 1/9 that of platform 390.

Figure 4:
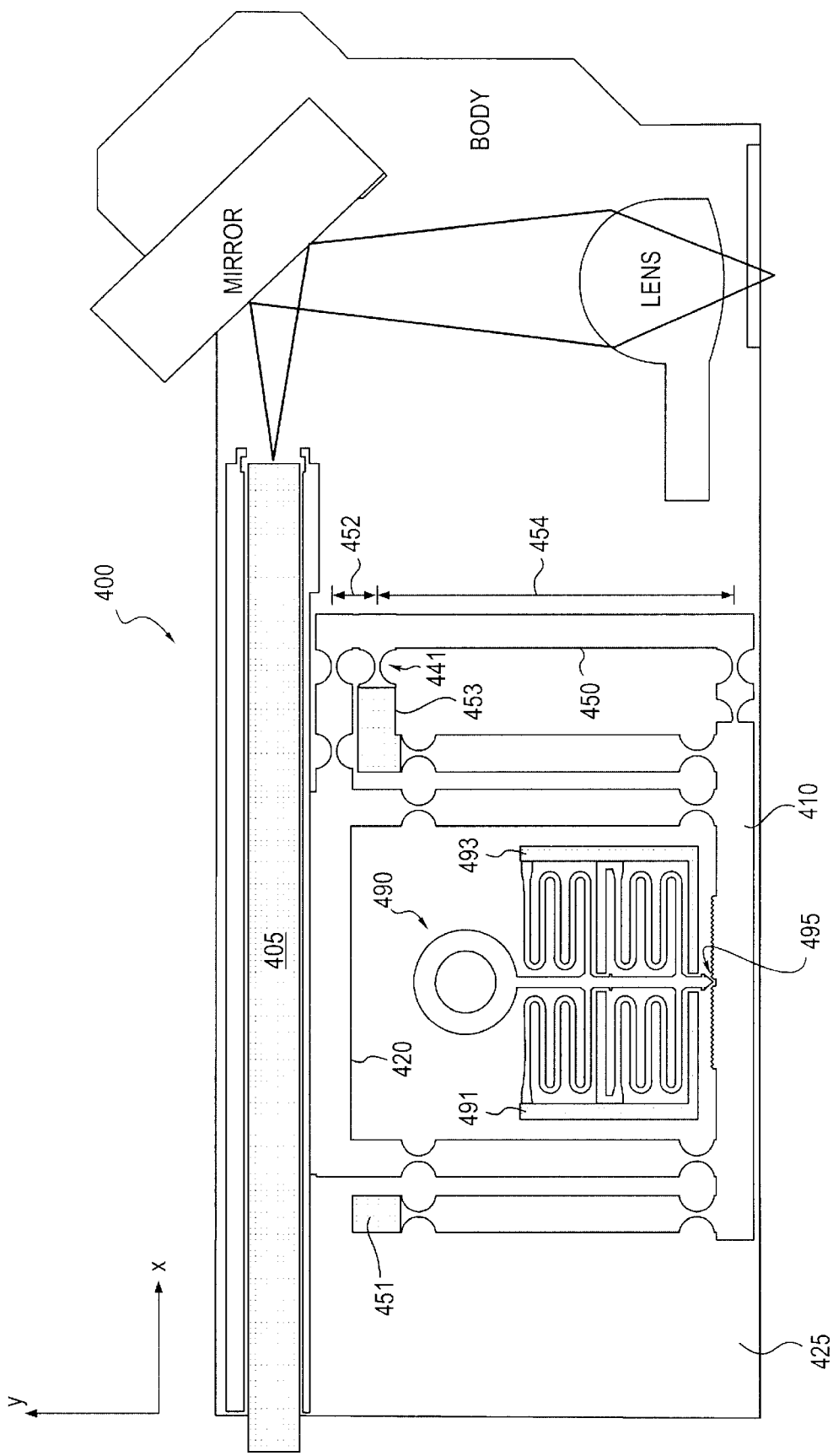
FIG. 4 illustrates another embodiment of an optical component adjuster.

FIG. 4 illustrates another embodiment of an optical component adjuster. Adjuster 400 operates as a slaved compound linear rectilinear spring that provides for relative motion between platforms 410 and 420. Platform 420 is coupled to fiber 405. Platforms 410 and 420 are coupled by a linkage of notched springs and pivot lever 450. The linkage of notched springs is coupled to body 425 at positions 451 and 453. Pivot lever 450 is coupled to body 425 via spring 441.

Pivot lever 450 is fixed to the substrate 425 at a point 453 disposed between platforms 310 and 320. The distance between platform 410 and fixed point 453 is length 452 and the distance between platform 420 and fixed point 453 is length 454. Similar to the linkage discussed above in relation to FIG. 3A, the linkage of notched springs in FIG. 4 provides kinematic coupling between platforms 410 and 420 having one degree of freedom. As such, any motion of platform 410 will impart a fixed motion on platform 420.

The ratio of the magnitude of motion between platforms 410 and 420 is set by the relative fixture location of pivot lever 450. In particular, the ratio of the motion of platform 420 to platform 410, relative to body 425, may be approximated by the ratio of length 454 to length 452 of pivot lever 450. In one embodiment, approximately an 8.6:1 ratio between length 454 and length 452 is used, where length 454 is 600 $\mu$m and length 452 is 70 $\mu$m.

In another embodiment, other ratios may be used. The ratio of the magnitude of motion between platforms 410 and 420 determines the magnitude of the motion of platform 420 along the x-axis with respect to platform 410.

A ratchet 495 is used to secure platform 430 at a desired position. Ratchet 495 is coupled to body 425 at positions 491 and 493. Pin 490 is used to engage and release ratchet 495 so that the fiber 405 position may be manually adjusted. In another embodiment, other devices may be used to adjust the position of fiber 405, for example, a motor.

Figure 5:
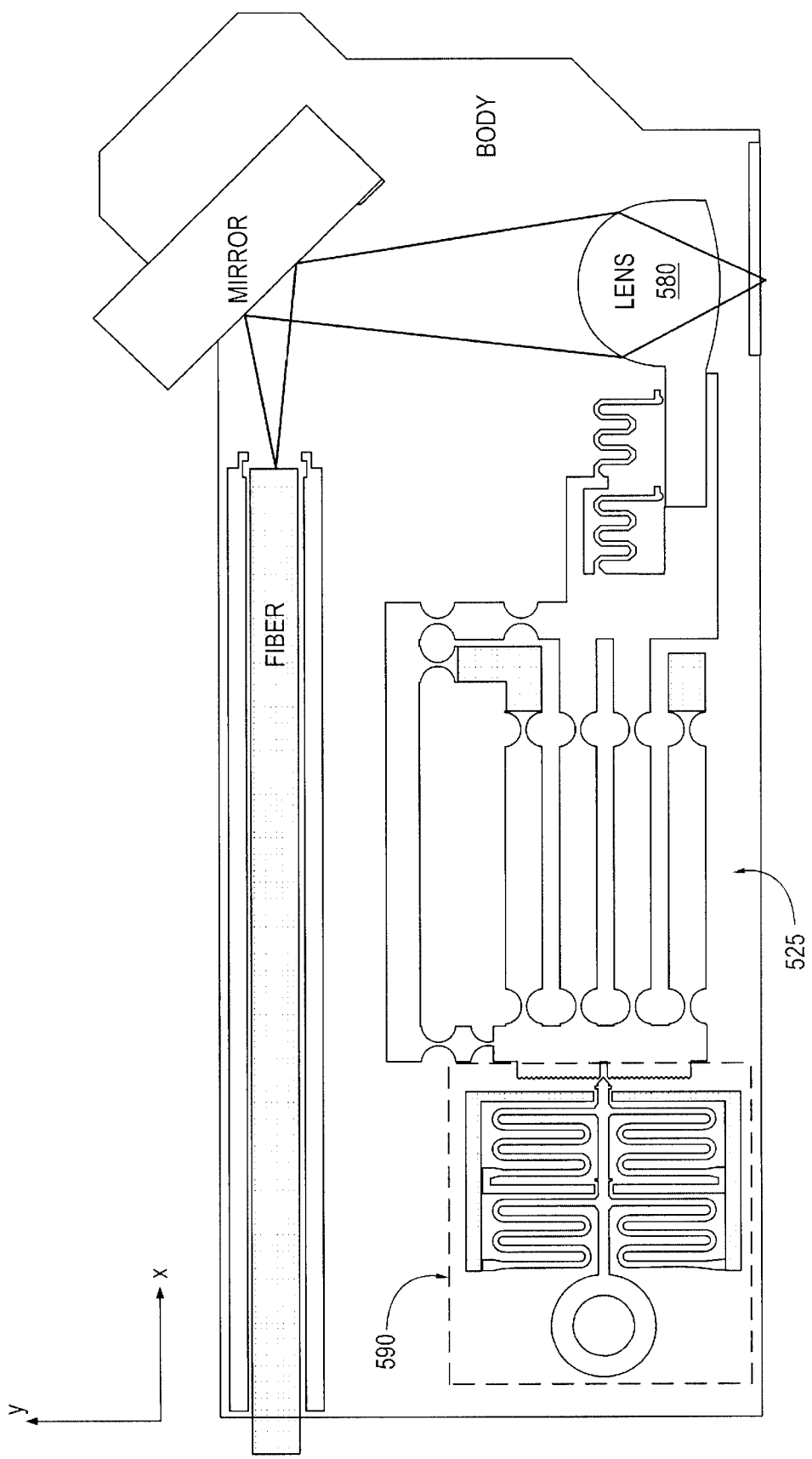
FIG. 5 illustrates yet another embodiment of an optical component adjuster.

In alternative embodiments, other configurations of a linkage of notched springs may be used to control the motion of an optical component, for example, as illustrated in FIG. 5. Ratchet and pin assembly 590 coupled to notched spring linkage 525 operates to adjust the position of lens 580 similar to that described above in relation to FIG. 4. In one embodiment, the linkage of notched springs operates similar to that described above in relation to FIGS. 2A and 2B.

In one embodiment, the optical component adjusters illustrated in FIGS. 2–5 may be fabricated using Deep Reactive Ion Etching (DRIE) techniques, as described in Emo H. Klassen, et al., Silicon Fusion Bonding and Deep Reactive Ion Etching; A New Technology For Microstructures, The 8th International Conference on Solid-State Sensors and Actuators, and Eurosensors IX, Stockholm, Sweden, June 1995. In an alternative embodiment, other techniques may be used to fabricate the adjusters illustrated in FIGS. 2–5.

As previously discussed, multiple linkage mechanisms illustrated in FIGS. 2–5 may also be connected in series to achieve total ratios equal to the product of the individual ratios. Furthermore, the linkage mechanisms illustrated in FIGS. 2–5 may also be used in a reverse manner whereby a relatively small motion (e.g., caused by a piezoelectric element) on one platform may cause a relatively large motion on the other platform.

The positions of the adjusters are shown on one side of the head assembly only for illustrative purposes. In other embodiments, the adjusters may be positioned on other sides of the head assembly, for example, a trailing end of the head assembly.

As previously noted, that the adjusters shown in the FIGS. 2–5 are not limited to use only in disk drive head assemblies but may also be used in other applications. For example, the adjusters may be used with laser collimators in projection systems and spectrometers.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An assembly, comprising:
   a first optic component;
   a substrate; and
   a first adjuster, comprising:
      a first platform coupled to the first optic component; and
      a linkage of springs coupled to the first platform and the substrate, the linkage of springs to provide for motion of the first platform along primarily one axis.

2. The assembly of claim 1, wherein the linkage of springs comprises a plurality of bars, each of the plurality of bars coupled to a plurality of springs.

3. The assembly of claim 2, wherein the first platform is manually adjustable along the one axis.

4. The assembly of claim 3, further comprising an actuator coupled to the first platform to position the first platform along the one axis.

5. The assembly of claim 4, wherein the linkage of springs is a linkage of notched springs.

6. The assembly of claim 5, wherein the first optic component is a fiber.

7. The assembly of claim 5, wherein the first optic component is a lens.

8. The assembly of claim 2, further comprising:
a lever coupled to the linkage of springs; and
an actuator coupled to the lever to move the first platform along the one axis.

9. The assembly of claim 1, further comprising a second platform coupled to the linkage of springs, and wherein the linkage of springs comprises:
a first plurality of bars, each of the plurality of bars coupled to a plurality of springs, the first plurality of bars coupled between the first and the second platforms; and
a first lever coupled between the first and the second platforms.

10. The assembly of claim 9, wherein the first lever is coupled to the substrate with a spring at a point along the first lever and wherein the point along the first lever determines a movement of the first platform relative to a movement of the second platform.

11. The assembly of claim 10, further comprising a third platform coupled to the linkage of springs, and wherein the linkage of springs further comprises:
a second plurality of bars, the second plurality of bars coupled between the second and the third platforms; and
a second lever coupled between the second and the third platforms.

12. The assembly of claim 11, wherein the second lever is coupled to the substrate with a spring at a point along the second lever and wherein the point along the second lever determines the movement of the second platform relative to a movement of the third platform.

13. The assembly of claim 10, further comprising a ratchet coupled to the second platform to manually adjust the second platform along the one axis.

14. The assembly of claim 10, further comprising an actuator coupled to the second platform to position the second platform along the one axis.

15. The assembly of claim 14, wherein the linkage of springs is a linkage of notched springs.

16. The assembly of claim 15, wherein the first optic component is a fiber.

17. The assembly of claim 15, wherein the first optic component is a lens.

18. The assembly of claim 1, further comprising:
a second optic component; and
a second adjuster, comprising:
a first platform, the first platform of the second adjuster coupled to the second optic component; and
a linkage of springs, the linkage of springs of the second adjuster coupled to the first platform of the second adjuster and the substrate, the linkage of springs to provide for motion of the first platform of the second adjuster along primarily one axis of the second adjuster.

19. The assembly of claim 18, further comprising:
a lever coupled to the linkage of springs of the second adjuster; and
an actuator coupled to the lever to move the first platform of the second adjuster along the one axis of the second adjuster.

20. The assembly of claim 19, wherein the one axis of the second adjuster is in a different plane than the one axis of the second adjuster.

21. The assembly of claim 19, wherein the actuator is selectively coupled between the first platform of the first adjuster and the lever of the second adjuster.

22. The assembly of claim 19, wherein the first optic component is a fiber and wherein the second optic component is a lens.

23. A head assembly, comprising:
a lens;
a body; and
an first adjuster, comprising:
a first platform coupled to the lens; and
a linkage of springs coupled to the first platform and the body, the linkage of springs to provide for motion of the first platform along primarily one axis.

24. The head assembly of claim 23, wherein the linkage of springs comprises a plurality of bars, each of the plurality of bars coupled to a plurality of springs.

25. The head assembly of claim 24, further comprising:
a lever coupled to the linkage of springs; and
a motor coupled to the lever to move the first platform along the one axis.

26. The head assembly of claim 25, wherein the linkage of springs is a linkage of notched springs.

27. The head assembly of claim 26, further comprising:
a fiber; and
a second adjuster, comprising:
a first platform, the first platform of the second adjuster coupled to the fiber; and
a linkage of springs, the linkage of springs of the second adjuster coupled to the first platform of the second adjuster and the body, the linkage of springs to provide for motion of the first platform of the second adjuster along primarily one axis of the second adjuster.

28. The head assembly of claim 27, wherein the linkage of springs of the second adjuster is a linkage of notched springs.

29. A disk drive, comprising:
an optics assembly; and
a head assembly, comprising:
a fiber coupled to the optics assembly;
a body;
a first adjuster, the first adjuster comprising:
a first platform coupled to the fiber; and
a linkage of notched springs coupled to the first platform and the body, the linkage of notched springs to provide for motion of the first platform along primarily one axis.

30. The disk drive of claim 29, wherein the head assembly further comprises:
a lens; and
a second adjuster, the second adjuster comprising:
a first platform, the first platform of the second adjuster coupled to the lens; and
a linkage of notched springs, the linkage of notched springs of the second adjuster coupled to the first platform of the second adjuster and the body, the linkage of notched springs of the second adjuster to provide for motion of the first platform of the second adjuster along primarily one axis of the second adjuster different from the one axis of the first adjuster.

* * * * *